United States Patent
Sakamoto

(10) Patent No.: US 6,764,136 B2
(45) Date of Patent: Jul. 20, 2004

(54) RECLINING ADJUSTER

(75) Inventor: Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/364,548

(22) Filed: Feb. 11, 2003

(65) Prior Publication Data

US 2003/0160489 A1 Aug. 28, 2003

(30) Foreign Application Priority Data

Feb. 26, 2002 (JP) ........................................ 2002-049365

(51) Int. Cl.[7] ................................................. B60N 2/22
(52) U.S. Cl. ............................. 297/362.14; 297/362.12
(58) Field of Search ....................... 297/362.14, 362.12, 297/362.11; 74/425

(56) References Cited

U.S. PATENT DOCUMENTS

| | | | | |
|---|---|---|---|---|
| 3,469,469 A | * | 9/1969 | Burger | 74/409 |
| 3,635,100 A | * | 1/1972 | Littmann | 74/411 |
| 4,979,404 A | * | 12/1990 | Nakata et al. | 74/409 |
| 5,295,730 A | * | 3/1994 | Rees | 297/361.1 |
| 5,605,071 A | * | 2/1997 | Buchanan, Jr. | 74/425 |
| 5,997,089 A | * | 12/1999 | Kawasaki | 297/362.14 |
| 6,428,104 B1 | * | 8/2002 | Sakamoto et al. | 297/362.11 |
| 6,491,130 B1 | * | 12/2002 | Honaga et al. | 180/444 |
| 6,520,042 B2 | * | 2/2003 | Jammer et al. | 74/425 |
| 6,523,431 B2 | * | 2/2003 | Ozsoylu et al. | 74/443 |

FOREIGN PATENT DOCUMENTS

| | | | |
|---|---|---|---|
| DE | 1088827 | 9/1960 | |
| DE | 4422529 | 5/1995 | |
| EP | 232685 A1 * | 8/1987 | ............ B60N/1/02 |
| EP | 06179923 | 2/1996 | |
| EP | 09027654 | 8/1998 | |
| EP | 1059193 A2 * | 12/2000 | ............ B60N/2/22 |
| EP | 11160886 | 12/2000 | |

* cited by examiner

*Primary Examiner*—Peter M. Cuomo
*Assistant Examiner*—Stephen D'Adamo
(74) *Attorney, Agent, or Firm*—Steinberg & Raskin, P.C.

(57) ABSTRACT

The objects of the present invention is to reduce a backlash at the time of locking of a seat back and to reduce clearance in the thrust direction of a worm so as to prevent generation of an abnormal noise with a simple structure suitable for mass production. Substantially cone-shaped recesses 15 and 16 are provided respectively on both end faces of the worm 4 pivotably attached on a seat cushion, and inside end faces of a pair of holders 13 and 14 to support these two end portions, and at the same time balls 17 are rotatably housed respectively in a pair of spaces formed in the recesses 15 and 16 facing each other to form a pair of bearings 11 and 12 which rotatably support the worm 4. A press means composed of a coil spring 25 and the like which presses the worm 4 to the worm wheel 5 is provided in a locking mechanism.

4 Claims, 3 Drawing Sheets

F I G. 3
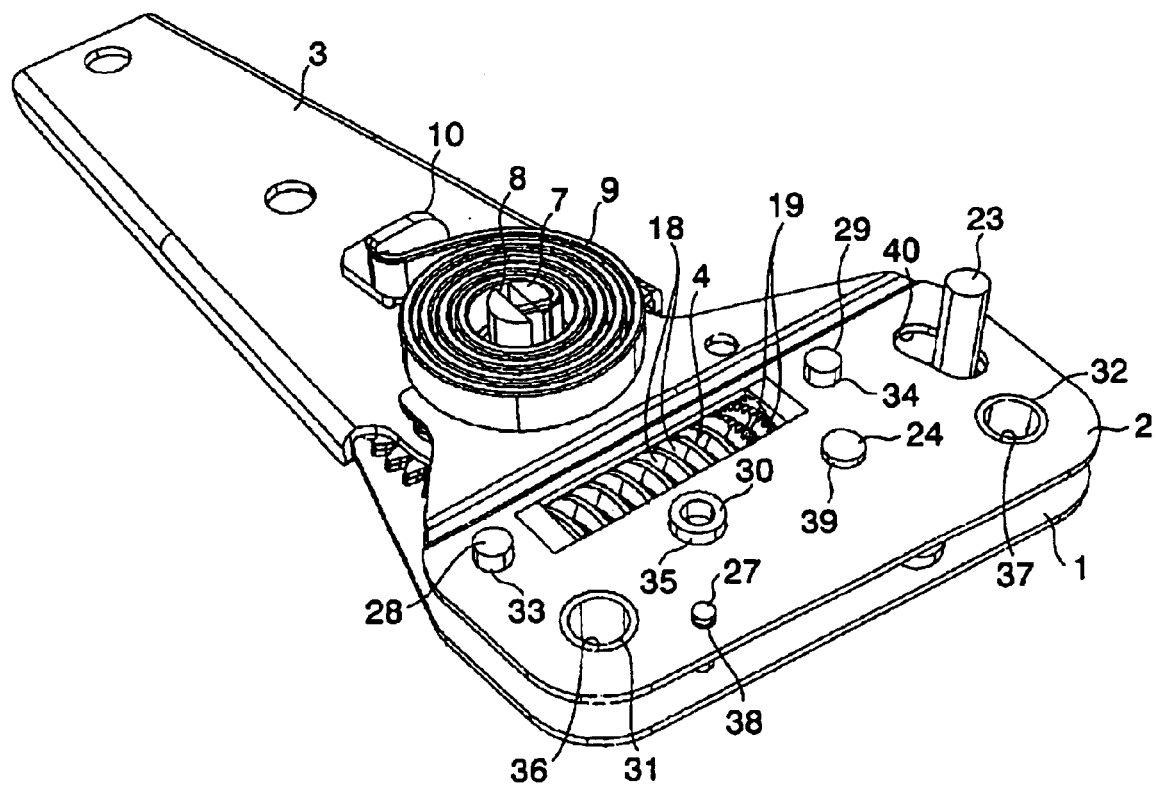

RECLINING ADJUSTER

BACKGROUND OF THE INVENTION

1. Field of the Invention

The present invention relates to a reclining adjuster which is attached to a seat for a vehicle and the like to appropriately adjust an inclination angle of a seat back to a seat cushion, and, in particular, to a technology to realize reduction of play of the seat back at the time of locking and so on.

2. Description of the Related Art

In a reclining adjuster disclosed in Japanese Utility Model Publication No. Sho 42-7950, a sector gear (a worm wheel) is fixed to a seat back, while a worm which is fittable with the sector gear is pivotably attached to a seat cushion.

The worm is connected to an operation shaft and engagement of the worm with the sector gear is released by drawing the operation shaft along the axial direction thereof and lifting it up further.

When a load is added to the seat back in this state, the seat back inclines so that the inclination angle can be promptly changed, and when the hand is off from the operation shaft, the worm engages with the sector gear again to hold the seat back at its position.

When a slight adjustment of the inclination angle of the seat back is required, the operation shaft is pivoted to allow the worm to rotate, which makes the sector gear engaging with the worm rotate gradually, so that the seat back can be changed to an arbitrary inclination angle steplessly.

In recent years, as is disclosed in Japanese Patent Laid-open Publication No. Hei 10-217817, a reclining adjuster is proposed, in which a worm having a lead angle equal to or more than the angle of friction and a sector gear are attached to the seat cushion and the seat back respectively, and by inclining the seat back, the worm is allowed to rotate through the sector gear so that the inclination angle of the seat back is appropriately changed.

However, in a case of a reclining adjuster having a sector gear and a worm engaging with each other, a backlash between tooth faces of the sector gear and the worm becomes a factor of the play at the time of locking of the seat back and causes problems of generating an abnormal noise or deterioration in a feeling of seating.

When a shaft of the worm is supported rotatably with bearings such as an ordinary ball bearing and the like, clearance is provided in the thrust direction to ensure a smooth movement of the worm. This clearance also causes play at the time of locking of the seat back and becomes a factor of generating an abnormal noise or deterioration in a feeling of seating.

In Japanese Patent Laid-open Publication No. 2000-342371, disclosed is a technology to attempt to reduce a backlash by pressing a sector gear engaging with a worm in the direction along the worm with a press member. However, in order to press the sector gear supported rotatably in the radial direction (in the direction toward the worm), it is necessary to provide an arc-shaped hole on the sector gear, and it is also required to form a hole corresponding to the bracket supporting the worm or to provide a roller member to press inside walls of these holes, which makes the structure complicated and unsuitable for mass production. The backlash at the time of locking of the seat back is surely reduced and the play of the seat back can be suppressed by pressing the sector gear against the worm. However, since the clearance in the thrust direction of the worm cannot be reduced, a problem of the play at the time of locking of the seat back due to such a clearance still remains.

SUMMARY OF THE INVENTION

The present invention is performed to solve the above-described disadvantages and aims to provide a reclining adjuster which has a simple structure suitable for mass production, reduces not only a backlash, but also clearance in the thrust direction of a worm at the time of locking of a seat back so that generation of an abnormal noise is prevented and a feeling of seating is further improved.

In order to achieve the above-described objects, the reclining adjuster of the present invention comprises: a worm pivotably attached to a seat cushion; a worm wheel fixed to the seat back and engaging with the worm; and a locking mechanism selectively operated to lock the worm so as to be unable to rotate or to release the locking, wherein recess portions are respectively provided on both end faces of the worm and on the inside end faces of a pair of support members to support the both end portions of the worm, and balls are rotatably housed respectively in a pair of spaces formed between the recesses where both end faces of the worm face a pair of the support members so that a pair of bearings are formed to rotatably support the worm, and wherein the locking mechanism includes a press means to press a tooth portion of the worm into a tooth portion of the worm wheel at the time of locking.

The above-described each recess is preferably formed substantially in a cone shape having a tapered surface on the inside face.

It is preferable that the above-described locking mechanism comprises an engaging claw which can engage and disengage with or from an engaging groove formed on a part of the tooth portion of the worm at the end portion thereof, and an arm member pivotably supported with a shaft member in order to engage and disengage the engaging claw with or from the engaging groove, wherein said press means is connected to the arm member, and is composed of an elastic member enforcing in the direction to engage the engaging claw to the engaging groove.

It is preferable that the above-described arm member is formed substantially in a shape of the letter T having a longer piece and a shorter piece, the boundary of the longer piece and the shorter piece is supported with the shaft member, the longer piece serves as an operation part, and the engaging claw is formed at a side end portion of the shorter piece. The above-described elastic member is provided between the arm member and an arbitrary fixing portion and is composed of a spring enforcing in the direction that the engaging claw engages with the engaging groove.

In this case, it is preferable that the above-described spring is provided between the other side end portion of the shorter piece of the arm member and a bracket which supports the worm.

BRIEF DESCRIPTION OF THE DRAWINGS

FIG. 3 is a perspective view showing an assembled state of the above reclining adjuster.

DETAILED DESCRIPTION OF THE PREFERRED EMBODIMENT(S)

Figure 1:
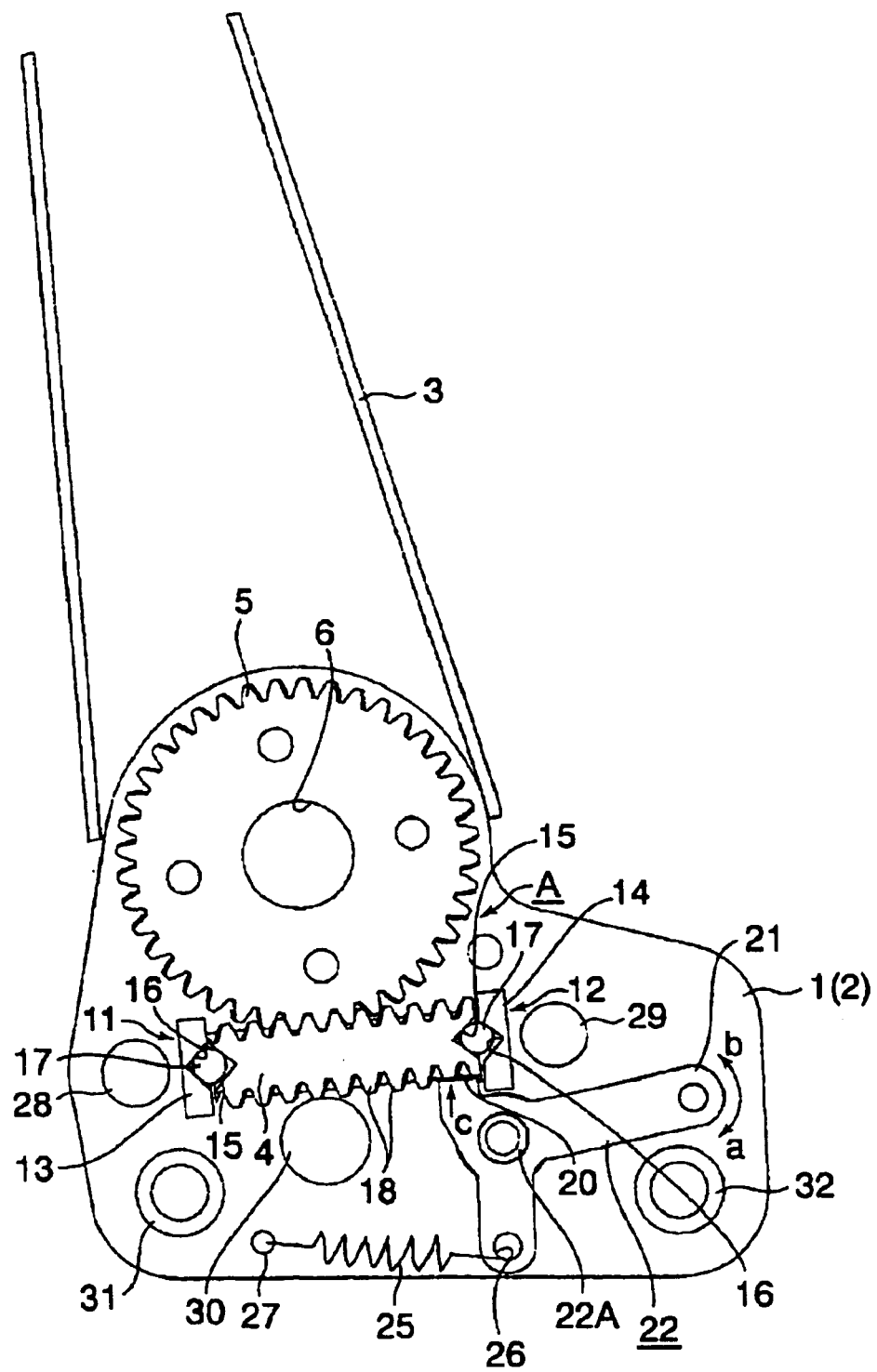
FIG. 1 is a schematic front sectional view of a reclining adjuster relating to an embodiment of the present invention.

Hereinafter, the present invention will be explained more in detail based on an embodiment shown in the drawings.

Figure 2:
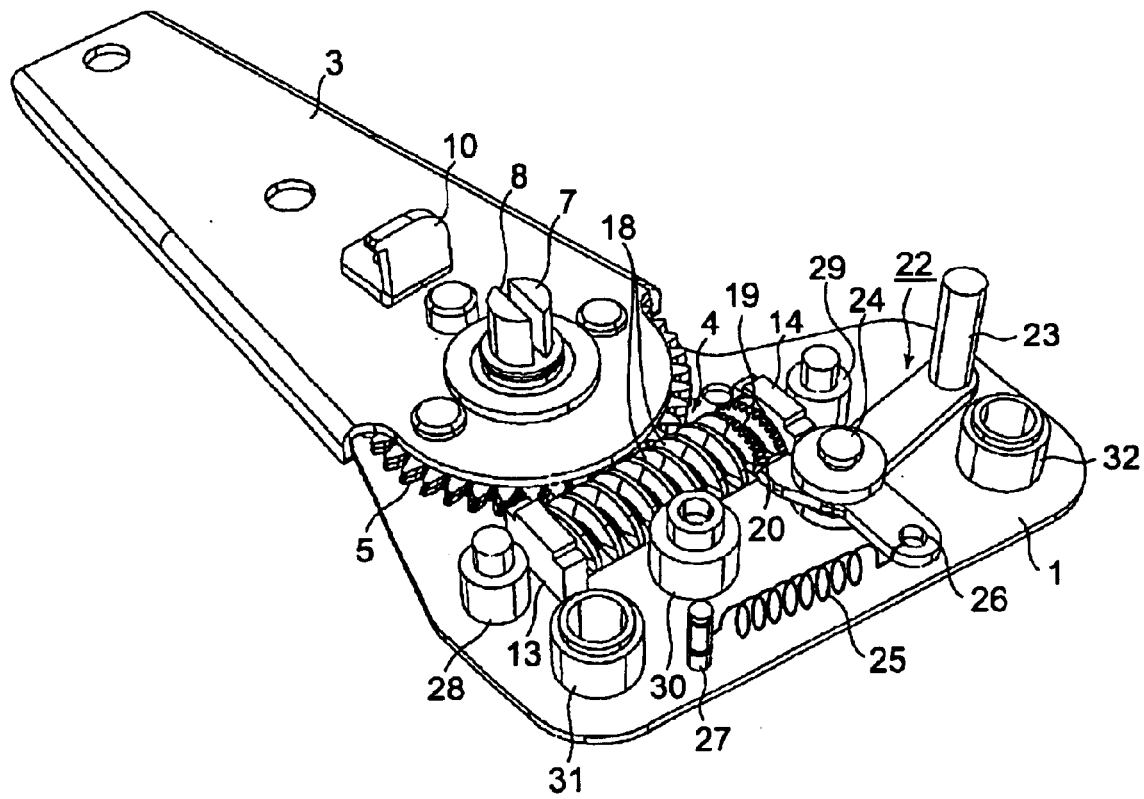
FIG. 2 is a perspective view showing in the middle of assembling of the above reclining adjuster.

FIG. 1 to FIG. 3 show a reclining adjuster A relating to the present invention, which is provided with a pair of first brackets 1 and 2 attached to a seat cushion (not shown), composing a portion of the seat cushion, and disposed oppositely to each other, and a second bracket 3 attached to a seat back (not shown), and composing a portion of the seat back.

In the first bracket 1, a worm 4 is rotatably attached, while a worm wheel 5 is fixed in the second bracket 3, and the worm 4 and the worm wheel 5 engage with each other. The worm 4 has a lead angle equal to or larger than the angle of friction with the worm wheel 5. It should be noted that the worm wheel 5 may be a helical gear having a tooth portion around the perimeter as shown in FIG. 1, and may be a sector gear.

A round hole 6 is bored in the center of the worm wheel 5 and a central shaft 7 loosely inserted to the round hole 6 is fixed to the first bracket 1. The worm wheel 5 is pivotably attached around the central shaft 7.

A slit 8 is formed on a side of the central shaft 7. A balance spring 9 is hooked on the slit 8 at one end portion of the balance spring 9 while the other end thereof is hooked on a hook shaft 10 attached to the second bracket 3. Thereby, the seat back supported with the second bracket 3 by an elastic force of the balance spring 9 is always enforced forward.

The front end portion of the worm 4 is rotatably supported with a front bearing 11 and the rear end portion is rotatably supported with a rear bearing 12.

Concretely, substantially cone-shaped recesses 15 and 16 are respectively provided on both end faces of the worm 4 and inside end faces of holders 13 and 14 as a pair of support members fixed to support the both end portions of the worm 4.

As a result, spaces are formed between the recesses 15 and 16 where the worm 4 faces the pair of holders 13 and 14, and steel balls 17 are housed rotatably in the pair of spaces respectively.

In such a structure, the worm 4 is rotatably supported with the holders 13 and 14 via the balls 17. The front and rear bearings 111 and 12 which rotatably support the worm 4 are respectively formed by a pair of the holders 13 and 14, and the balls 17 housed in the spaces between the recesses 15 and 16 where the worm 4 faces the pair of holders 13 and 14.

The reclining adjuster A includes a locking mechanism which is selectively operated to lock the worm 4 to be unable to rotate or to release the locking thereof.

This locking mechanism includes an engaging claw 20 which can engage and disengage with or from an engaging groove 19 formed on a part of a tooth portion 18 of the worm 4 at one end portion thereof, and an arm portion 22 having an operation part 21 at the other end portion.

In the present embodiment, the engaging grooves 19 are composed of a plenty of grooves having projections and depressions in the peripheral direction on the outer periphery of two paralleled tooth portions 18 of one side end portion of the worm 4.

An arm member 22 is formed substantially in a shape of the letter T having a longer piece and a shorter piece, and the engaging claw 20 is formed on one side end portion of the shorter piece.

It is structured in such that a pin 24 as a shaft member is inserted through a boss 22A on the boundary portion of the longer piece and a shorter piece of the arm member 22, and the arm member 22 is pivotably supported with the pin 24. The longer piece composes an operation part 21, and the engaging claw 20 formed on the short piece engages and disengages with or from the engaging groove 19 of the above-described worm 4 by pivoting the operation part 21 around the pin 24 to perform locking or releasing of the locking.

That is, when the engaging claw 20 is engaged with the engaging groove 19, the worm 4 and the worm wheel 5 to engage therewith become unable to rotate, so that the seat back is locked and the inclination angle is fixed. On the other hand, when the engaging claw 20 is disengaged from the engaging groove 19 by operating the arm member 22, the worm 4 and the worm wheel 5 become unable to rotate so that the locking of the seat back is released.

Incidentally, on the end portion of the operation part 21 of the longer piece of the arm member 22, an operation knob 23 to be held by a seated person is formed.

The locking mechanism of the present embodiment is provided with a press means to press the worm 4 against the worm wheel 5.

In the present embodiment, the press means comprises a coil spring 25 as an elastic member to elastically enforce the above-described arm member 22.

That is, the coil spring 25 is fixed to a fixing hole 26 formed on the other end portion of the shorter piece of the arm member 22 at one side end portion of the coil spring 25, and fixed to a fixing pin 27 serving as a fixing portion formed on the first bracket 1 at the other end portion of the coil spring 25.

A pair of the first bracket 1 and 2 are assembled by fitting pins 28 to 32 of one of the first bracket 1, the pin 24 fitted to the boss 22A of the arm member 22, and the fixing pin 27 to holes 33 to 39 of the other first bracket 2. The operation knob 23 of the arm member 22 is inserted into a long hole 40 formed in the other first bracket 2.

The function of the reclining adjuster A having such a structure will be explained next.

In a normal state in which the arm member 22 is not operated, the arm member 22 is enforced in the direction shown by the arrow "a" in FIG. 1 by the elastic force of the coil spring 25, so that the engaging claw 20 formed on the side end portion of the shorter piece of the arm member 22 engages with the engaging groove 19 of the worm 4.

Since the rotation of the worm 4 is interrupted in this state, the rotation of the worm wheel 5 engaging with the worm 4 is also interrupted, so that it comes a locking state in which the inclination angle of the seat back to the seat cushion is maintained. The functions of the arm member 22 which composes a locking mechanism in such a state and the coil spring 25 as a press means will be explained later.

On the other hand, when the inclination angle of the seat back is required to change, the arm member 22 is operated to move the operation part 21 in the direction shown by the arrow "b" in FIG. 1 against the elastic force of the coil spring 25 to allow the engaging claw 20 to disengage from the engaging groove 19. Thus, release from the locking state is performed and the worm 4 is in a state to be able to pivot freely.

Here, since the worm 4 has a lead angle equal to or larger than the angle of friction between the engaging worm wheel 5 when the rotational force around the central shaft 7 is applied to the worm wheel 5, the worm 4 rotates. Accordingly, the seat back falls forward by the elastic force of the balance spring 9, or falls backward against the elastic force of the balance spring 9 by application of a backward load to the seat back by a seated person.

When the hand is off from the operation part 21 (operation knob 23) of the arm member 22 at a required position, the engaging claw 20 is engaged with the engaging groove 19 by the elastic force of the coil spring 25, so that the rotation of the worm 4 is interrupted to lock the worm 4 and the inclination angle of the seat back is maintained at the present angle.

When the engaging claw 20 of the shorter piece of the arm member 22 is engaged with the engaging groove 19 of the worm 4, a force is generated in the worm 4 to shift toward the worm wheel 5 by pressing the engaging claw 20 toward the engaging groove 19 as shown in the arrow "c" in FIG. 1 by the elastic force of the coil spring 25. Thereby, the tooth portion of the worm 4 is pressed toward the tooth portion of the worm wheel 5.

As a result, a backlash between the tooth faces of the worm 4 and the worm wheel 5 can be made small at the time of locking of the seat back. Accordingly, the play at the time of locking of the seat back due to the backlash is suppressed, generation of an abnormal noise is prevented and at the same time, a stable feeling of seating can be obtained.

Further, in this structure, the bearings 11 and 12 which support the worm 4 is structured to house the balls 17 in the spaces between the recesses 15 and 16 where the worm 4 faces a pair of the holders 13 and 14. Accordingly, when the shaft line of the worm 4 moves in the direction coming close to the worm wheel 5, the balls 17 move along inside tapered faces of both recess 15 and 16.

Thus, when the worm 4 is pressed toward the worm wheel 5, the worm 4 is supported with the bearings in a state that the balls 17 are shifted along the inside tapered surfaces of both recesses 15 and 16. As a result, since the worm 4 is pressed toward the thrust direction by the balls 17, clearance in the thrust direction of the worm 4 becomes small at the time of locking of the seat back, so that the play of the seat back and generation of the abnormal noise due to such a clearance can be suppressed and the feeling of seating can be improved.

In particular, since it is sufficient to provide a locking mechanism including the arm member 22 and the coil spring 25 and the bearings 11 and 12 which support the worm 4 are structured to house the balls 17 in the spaces between the recesses 15 and 16 where the worm 4 faces a pair of the holders 13 and 14 as a structure to reduce the backlash at the time of locking of the seat back and to reduce the clearance in the thrust direction of the worm 4, the structure is simple and suitable for mass production.

It should be noted that though the coil spring 25 is used in the above-described embodiment as the press means, other type of spring can be used. Further, the shape of the arm member composing the locking mechanism is also not limited to the embodiment shown in the drawings.

The reclining adjuster of the present invention is characterized in that respective recesses, preferably substantially cone-shaped recesses, are provided on both end faces of the worm and inside end faces of a pair of support members, and at the same time, balls are rotatably housed respectively in a pair of spaces formed between the recesses where both end faces of the worm face a pair of the support members so that a pair of bearings to rotatably support the worm are formed, and a locking mechanism to lock the worm includes a press means to move the worm and press toward the worm wheel.

As a result, at the time of locking the seat back, a backlash between the tooth faces of the worm and the worm wheel can be reduced, generation of an abnormal noise is prevented and deterioration in a feeling of seating can be prevented. Further, since the worm is supported with the bearings in a state that the balls are shifted along the inside tapered surfaces of the both recesses when the worm is pressed toward the worm wheel, clearance in the thrust direction of the worm is reduced so that the play of the seat back or the generation of the abnormal noise due to the clearance can be suppressed, and the feeling of seating can be improved further. Besides, since it is a simple structure, it is suited for mass production.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A reclining adjuster, comprising:

a worm pivotably attached to a seat cushion;

a worm wheel fixed to a seat back and engaging with the worm; and a locking mechanism selectively operated to lock the worm to be unable to rotate or to release the locking, wherein recess portions are respectively provided on both end faces of said worm and on the inside end faces of a pair of support members to support the both end portions of the worm, and balls are rotatably housed respectively in a pair of spaces formed between the recesses where both end faces of the worm face a pair of the support members so that a pair of bearings are formed to rotatably support the worm, wherein said locking mechanism includes a press means to press a tooth portion of said worm into a tooth portion of the worm wheel at the time of locking;

wherein said locking mechanism comprises: an engaging claw which can engage and disengage with or from an engaging groove formed on a part of the tooth portion of the worm at the end portion thereof and an arm member pivotably supported with a shaft member in order to engage and disengage the engaging claw with or from the engaging groove, and wherein said press means is connected to the arm member, and is composed of an elastic member enforcing in the direction to engage said engaging claw to the engaging groove.

2. The reclining adjuster according to claim 1, wherein said each recess is formed substantially in a cone shape having a tapered surface on the inside face.

3. The reclining adjuster according to claim 1, wherein said arm member is formed substantially in a shape of the letter T having a longer piece and a shorter piece, the boundary of the longer piece and the shorter piece is supported with said shaft member, the longer piece serves as an operation part, and said engaging claw is formed at a side end portion of the shorter piece, wherein said elastic member is provided between the arm member and an arbitrary fixing portion and is composed of a spring enforcing in the direction that the engaging claw engages with the engaging groove.

4. The reclining adjuster according to claim 3, wherein said spring is provided between the other side end portion of the shorter piece of said arm member and a bracket supporting said worm.

* * * * *